July 10, 1962  R. H. WITT ETAL  3,043,078
FORAGE HARVESTER KNIFE STRUCTURE
Filed Sept. 30, 1959

INVENTORS
Robert W. Witt
Arthur W. Barows

3,043,078
FORAGE HARVESTER KNIFE STRUCTURE
Robert H. Witt, Hinsdale, and Arthur G. Barows, Downers Grove, Ill., assignors to International Harvester Company, Chicago, Ill., a corporation of New Jersey
Filed Sept. 30, 1959, Ser. No. 843,456
2 Claims. (Cl. 56—289)

This invention relates to forage harvesters of the type commonly known as utility harvesters wherein the cutter head comprises a rotor which directly engages the crops in the field and severs the same and conveys them and more particularly the invention appertains to a knife structure for such harvester.

A general object of the invention is to provide a knife structure which is of novel construction which provides exceptional cutting capacity and at the same time affords a highly efficient slinging action for discharging material.

A further object of the invention is to provide such a novel knife structure which comprises in addition to a cutting portion a novel scooping and retaining portion for holding the material confined within the knife so as to more adequately control the discharge thereof.

A more specific object of the invention is to provide a novel compound knife structure which is provided with a leading cutting edge on a curved outer lower or leading portion of the knife, the structure being formed of a flat sheet of metal and being bent along its lateral edges from intermediate its extremities to its rear extremity to provide confining sides and spaced mounting portions for suspending the knife from an associated support structure.

A still further object of the invention is to provide a novel knife structure which has a primary leading cutting edge and which is provided with lateral cutting edges directed in the direction of movement of the knife in order to cut the material into controllable bobs or pellets without the normally attendant stragglings which resist the flight of the material as it is slung by the knife.

A still further object of the invention is to provide a novel knife blade in which the root end or the mounting portion is formed by bending the lateral sides of the blade to provide a condensing pocket for the material which is cut by the full width leading edge of the blade.

These and other objects of the invention will become more apparent from the specification and the drawings, wherein.

Figure 1:
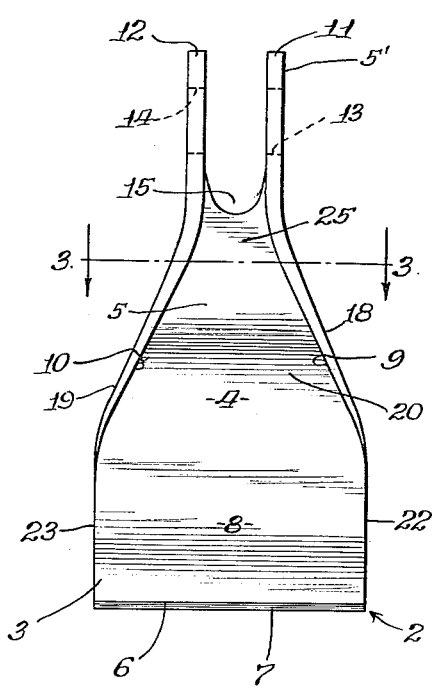
FIGURE 1 is a front elevational view of the novel knife structure.
Figure 2:
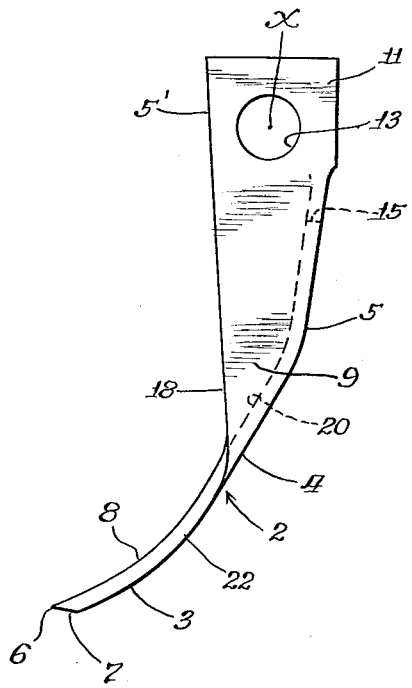
FIGURE 2 is a side elevational view thereof.
Figure 3:
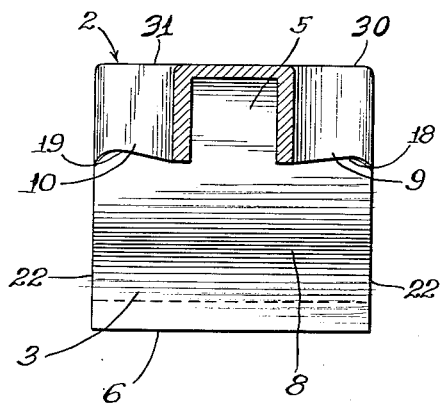
FIGURE 3 is a cross sectional view taken substantially on the line 3—3 of FIGURE 1.

Describing the invention in detail and having particular reference to the drawings, the knife generally designated 2 is formed of flat sheet steel stock and comprises a leading or forward scoop section 3, an intermediate paddle section 4, a trailing pocket section 5, and a root end portion 5'.

The forward section 3 is relatively wide and has a leading sharpened edge 6 which is beveled along the back side as at 7, the forwardly facing side 8 being concave and merging at its rear into the substantially flat intermediate paddle portion 4 which presents a material-slinging forward face extending diagonally upwardly and rearwardly from the portion 3, portion 4 being provided at its lateral edges with integral forwardly projecting side flanges or sections 9 and 10 which converge inwardly, that is to the root portion 5' of the knife structure, and provide at the root portion 5' generally parallel ears or hangers or knife-mounting lugs 11 and 12 which are laterally aligned and provided with registering knife mounting openings 13 and 14 for mounting the knife on the associated pin or shaft on which the knife is swingable. It will be seen that the knife is cut out as at 15 at the root portion in order to control the formation of the ears 11 and 12 and at the same time provide an escape for any material which may wedge therein as the material is cut by the leading edge 6 and slides inwardly along the curved surface or forwardly facing side or scooping face 8 of the forward or leading section 3 of the knife and pockets within the confining side walls or flanges 9 and 10 which tend to compact the material momentarily as it is moving radially inwardly of the knife substantially at the moment of severance and before centrifugal action starts slinging the material outwardly. It will be observed that the leading edges 18 and 19 provide sharp corners adjacent to the trailing extremity 20 of the leading portion of the knife. These edges or corners 18 and 19 function to sever any material which tends to hang over and beyond the lateral margins 22 and 23 of the leading portion 3 of the knife.

It will be seen that the flanges 9 and 10 converge rootwardly along the lateral edges 30 and 31 of the paddle portion 4 of the blade and that the trailing segment 25 of the paddle portion 4 is disposed at an angle of between 75° and 85° to the vertical whereas the paddle portion 4 is disposed between 40° and 65° with respect to the vertical. The pivotal axis X represents the swinging axis of the knife.

By shaping the knife as heretofore indicated the mass of material is condensed into compacted pellets which have a mass more readily propelled than a similar quantity of loose material. It will be noted that the pocket area functions not only to condense the material but prevents its spilling over the back area of the knife where it would be lost because it would sift onto the ground. The knife cooperates with an associated housing structure such as is well known to those skilled in the art as shown in U.S. Patent 2,786,317 to provide control discharge into the outlet area. The sides 9 and 10 not only retain the material on the knife but also control its discharge.

What is claimed is:

1. A knife for use in a forage harvester comprising an elongated platelike member having a cutting edge at one end, and a pivot means adjacent its opposite end lying in a plane substantially parallel to that of said cutting edge, said member being curved in longitudinal cross section and said member having upstanding cutting edge portions on the portion thereof adjacent said pivot means, said portions being on the concave side of said member.

2. The invention according to claim 1 and said edge portions converging toward the pivot means and defining a material confining pocket.

References Cited in the file of this patent

UNITED STATES PATENTS

| | | |
|---|---|---|
| 107,218 | Bourne | Sept. 13, 1870 |
| 1,442,577 | Kugel et al. | Jan. 16, 1923 |
| 2,507,247 | Davis et al. | May 9, 1950 |
| 2,590,065 | Mott | Mar. 18, 1952 |
| 2,700,511 | Denovan et al. | Jan. 25, 1955 |
| 2,786,317 | Tundell | Mar. 26, 1957 |
| 2,797,478 | Gebhart et al. | July 2, 1957 |
| 2,942,361 | Pope | June 28, 1960 |